Sept. 25, 1951   H. A. BOLLER   2,569,147
METERING ROD SUPPORT
Filed March 4, 1947
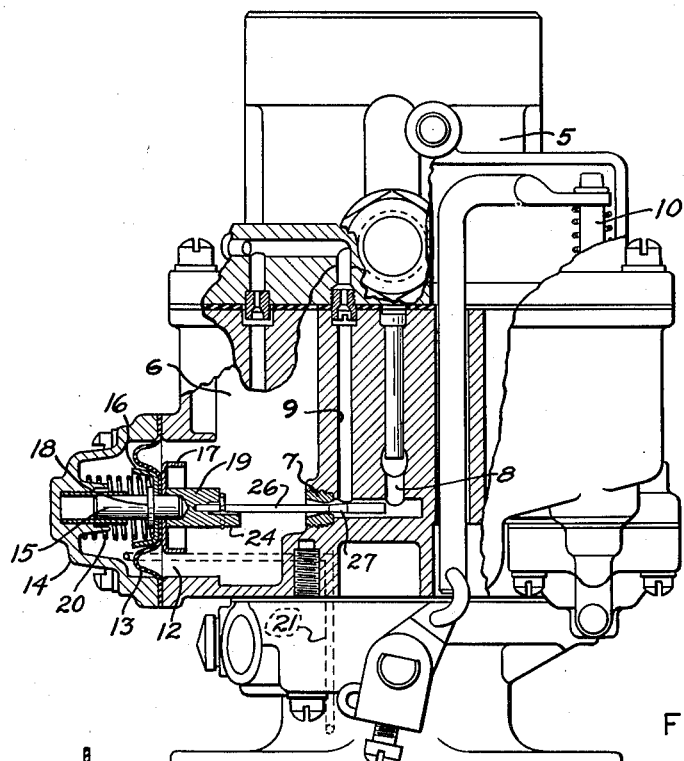
FIG. 1.
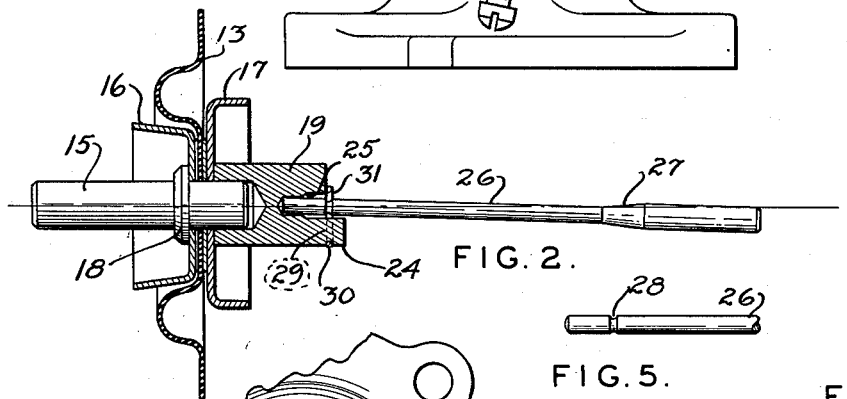
FIG. 2.
FIG. 5.
FIG. 4.
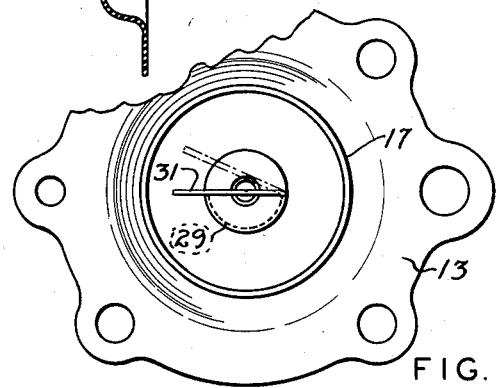
FIG. 3.
INVENTOR
HENRY A. BOLLER
BY
*George R. Ericson*
ATTORNEY Patented Sept. 25, 1951

2,569,147

UNITED STATES PATENT OFFICE 2,569,147

METERING ROD SUPPORT

Henry A. Boller, Pontiac, Mich., assignor to Carter Carburetor Corporation, St. Louis, Mo., a corporation of Delaware Application March 4, 1947, Serial No. 732,331

1 Claim. (Cl. 287—119)

This invention relates to metering valves and consists particularly in novel means for assembling and supporting a rod type valve, as used in internal combustion engine carburetors, for instance, with its support and operating member.

In some forms of carburetors, the liquid fuel supply is variably metered by means of a metering rod which cooperates with a metering orifice in the main fuel passage. Where this rod is operated through the intermediary of a flexible diaphragm, the assembling of the rod with the diaphragm so that the rod may be readily removed for inspection and/or replacement has presented difficulties.

Consequently, an object of the present invention is to provide a novel simplified attachment between the operating member, and the diaphragm and the metering rod.

Another object is to provide an assembly of a metering rod and its operating member in which the rod may be readily applied and removed without the necessity of removing pins or keys which may be lost.

Still another object is to provide a novel assembly of a metering rod and operating member which provides for proper axial movement of the rod within the metering orifice, while inherently maintaining the rod in a stable position within the orifice.

These objects and other more detailed objects hereafter appearing are attained by the structure illustrated in the accompanying drawing in which Fig. 1 is a side view, partly sectioned, illustrating an internal combustion engine carburetor embodying the invention.

Fig. 2 is an enlarged view of the metering rod and diaphragm assembly.

Fig. 3 is an elevation of the operating diaphragm with the metering rod removed.

Fig. 4 is a view of the rod retainer spring.

Fig. 5 shows one end of the metering rod.

The carburetor has a downdraft mixture barrel 5 provided with the usual choke and throttle valves (not shown) and a fuel bowl 6 having a main metering orifice 7 in the lower portion thereof. Fuel is supplied, in the usual manner from the bowl through the orifice to main fuel passage 8 and idling fuel passage 9. An accelerating pump, shown in part at 10, is also provided in the fuel bowl.

An opening 12 in one wall of the bowl is sealed by a flexible diaphragm 13 secured in position by a cap 14. A plunger 15 extends centrally through the diaphragm and is secured thereto, with intervening washer cups 16 and 17, by a collar 18 on the plunger and a cylindrical member 19 pressed on the opposite end of the plunger. The diaphragm is constantly urged toward the right by means of a coiled spring 20 and is operated in the opposite direction by engine suction transmitted through a passage indicated at 21.

Member 19, at its inner extremity is provided with a semi-circular underlying lip 24 and an axial, countersunk orifice 25. A metering pin 26 has a tapered extremity 27 which extends through and cooperates with metering orifice 7. An annular recess 28 is provided in the rod adjacent the opposite extremity thereof (Fig. 5) which is received in orifice 25 of member 19. A peripheral groove 29, formed in the outer surface of lip 24, receives the loop portion 30 of a spring wire, having a straight, transverse finger portion 31 which normally overlies the mouth of orifice 25, as indicated in Fig. 3. This finger portion is distorted, approximately to the broken line position of Fig. 3, to permit insertion of the metering pin into orifice 25 and, thereafter, this finger portion is resiliently seated in annular groove 28 of the metering rod so as to maintain the assembly. Furthermore, this finger portion 31 bears resiliently against the rod so as to cause the same to tilt slightly and thereby bear stably against one side of metering orifice element 7. The degree of tilting of the metering rod, of course, depends upon the depth and diameter of orifice 25.

In order to remove the metering pin, it is merely necessary to flex spring finger 31, then slide the metering rod slightly in a longitudinal direction to release the same from its operating member. Usually, this will be accomplished after the diaphragm assembly is removed because of the restricted space available within the fuel bowl for withdrawing the metering pin from orifice element 7. Accordingly, the metering pin retainer remains assembled with the operating diaphragm portion after the metering rod is removed therefrom. The retainer spring not only serves to maintain the metering rod in position, but functions as a spring for holding the rod stably against one side of the metering orfice, as is necessary to insure a uniform fuel flow.

Various features of application and details of embodiment may be modified as will occur to those skilled in the art and the exclusive use of all modifications as come within the scope of the appended claim is contemplated.

I claim:

In a metering rod assembly, a metering rod for use in controlling fluid passing through an orifice, a supporting and actuating structure for said metering rod, said supporting and actuating structure including a member having one end formed with an axial socket, one end of said metering rod being pivotally seated in the end of the socket, said socket being of greater diameter than said rod to permit pivotal movement of the rod, a projecting lip extending from the end of said member adjacent said socket, said lip being formed with a transverse groove in its outer face, a spring loop structure including a spring arm seating in said transverse groove in said lip, and an additional spring arm engaging one side of said rod, said metering rod including an outwardly facing shoulder normally abutting the adjacent face of said additional spring arm, whereby said metering rod is retained against longitudinal displacement and normally urged against one side of said socket.

HENRY A. BOLLER.

REFERENCES CITED

The following references are of record in the file of this patent:

UNITED STATES PATENTS

| Number | Name | Date |
|---|---|---|
| 1,114,123 | Dalton | Oct. 20, 1914 |
| 1,782,196 | Dalton | Nov. 18, 1930 |
| 1,961,747 | Ewart | June 5, 1934 |
| 2,142,290 | Slocum | Jan. 3, 1939 |
| 2,394,663 | Carlson et al. | Feb. 12, 1946 |
| 2,407,535 | Carlson et al. | Sept. 10, 1946 |